United States Patent
Yoshimura et al.

[11] Patent Number: 6,099,753
[45] Date of Patent: Aug. 8, 2000

[54] PHOSPHOR, ITS MANUFACTURING METHOD AND PLASMA DISPLAY PANEL

[75] Inventors: Futoshi Yoshimura, Shizuoka-Ken; Nobuyuki Sudou, Yokohama, both of Japan

[73] Assignee: Kabushiki Kaisha Toshiba, Kawasaki, Japan

[21] Appl. No.: 09/007,516

[22] Filed: Jan. 15, 1998

[30] Foreign Application Priority Data

Jan. 16, 1997 [JP] Japan ..................... 9-005266

[51] Int. Cl.⁷ .............. C09K 11/02; H01J 17/00
[52] U.S. Cl. .............. 252/301.4 R; 252/301.6 F; 313/582; 313/584; 427/215; 427/180; 427/184; 428/403; 428/404
[58] Field of Search .................. 313/582, 584; 428/403, 404; 427/215, 180, 184; 252/301.4 R, 301.4 F, 301.4 P, 301.4 S, 301.4 H, 301.5, 301.6 S, 301.6 R, 301.6 F, 301.6 P

[56] References Cited

U.S. PATENT DOCUMENTS

| | | | |
|---|---|---|---|
| 5,126,204 | 6/1992 | Tono et al. | 252/301.6 R |
| 5,196,229 | 3/1993 | Chau | 427/215 |
| 5,244,750 | 9/1993 | Reilly et al. | 252/301.6 R |
| 5,604,396 | 2/1997 | Watanabe et al. | 313/485 |
| 5,908,698 | 6/1999 | Budd | 252/301.6 R |

FOREIGN PATENT DOCUMENTS

| | | |
|---|---|---|
| 52-22579 | 2/1977 | Japan . |
| 52-22587 | 2/1977 | Japan . |
| 8-73844 | 3/1996 | Japan . |
| 9-263753 | 10/1997 | Japan . |

OTHER PUBLICATIONS

Chemical abstract citation for JP 52–22579, Feb. 19, 1977.

*Primary Examiner*—C. Melissa Koslow
*Attorney, Agent, or Firm*—Oblon, Spivak, McClelland, Maier & Neustadt, P.C.

[57] ABSTRACT

An object of the present invention is to provide a phosphor capable of improving the light emitting efficiency of a plasma display panel and restraining the deterioration of luminance and a change in chromaticity with the passage of time, and also provide a manufacturing method of this phosphor and the plasma display panel using this phosphor. To achieve this object, the surfaces of phosphor particles for a plasma display panel are covered with a metallic oxide generated by the hydrolysis of a metallic alkoxide. A manufacturing method of the phosphor particles for the plasma display panel is characterized in that the metallic alkoxide is attached to the phosphor particle surfaces and is burned. In this manufacturing method, the phosphor particle surfaces are covered with a close film of the metallic oxide. The plasma display panel uses the phosphor particles having surfaces covered with the metallic oxide.

8 Claims, 2 Drawing Sheets

PHOSPHOR, ITS MANUFACTURING METHOD AND PLASMA DISPLAY PANEL

BACKGROUND OF THE INVENTION

1. Field of the Invention

The present invention relates to a phosphor for a plasma display panel having a phosphor particle surface covered with a metallic oxide, its manufacturing method and the plasma display panel using this phosphor.

2. Prior Art

Recently, the demand of a plasma display panel (PDP) as a display image apparatus instead of a cathode ray tube (CRT) has been increased. The structure of the plasma display panel is characterized in that the plasma display panel can be made thin and light in weight in comparison with the cathode ray tube. The plasma display panel has preferable image characteristics such as luminance, contrast, etc. similar to those of the cathode ray tube.

In a phosphor used as a light emitting material of the plasma display panel at present, light is emitted by exciting this phosphor by an ultraviolet ray of 147 nm in wavelength caused by xenon (Xe) gas discharge under vacuum. However, the practically used phosphor for the plasma display panel has low light emitting efficiency with respect to the ultraviolet ray of 147 nm in wavelength and a requirement for an improvement of the plasma display panel is raised.

There are excellent color purity, undeteriorated luminance, chromaticity unchanged with the passage of time, excellent coating characteristics, etc. as the other characteristics required for the phosphor for the plasma display panel. It is desirable to improve the characteristics of the plasma display panel by improving the phosphor with respect to such properties.

SUMMARY OF THE INVENTION

To obtain the above required characteristics, an object of the present invention is to provide a phosphor capable of particularly improving the light emitting efficiency of a plasma display panel and restraining the deterioration of luminance and the change in chromaticity with the passage of time, and also provide a manufacturing method of this phosphor and the plasma display panel using this phosphor.

The inventors examined contents for achieving the above object many times. As a result, it has been found that the light emitting efficiencies of phosphor particles and a plasma display panel using these phosphor particles are improved by covering surfaces of the phosphor particles for the plasma display panel with a metallic oxide generated by the hydrolysis of a metallic alkoxide solution so that the deterioration of luminance and a change in chromaticity with the passage of time can be restrained. Thus, the present invention has been completed on the basis of these findings.

Namely, in the phosphor for the plasma display panel of the present invention, the surfaces of phosphor particles are covered with a metallic oxide generated by the hydrolysis of a metallic alkoxide. The phosphor particles for the plasma display panel of the present invention having surfaces covered with a close or dense film of the metallic oxide are obtained by attaching the metallic alkoxide onto the phosphor particle surfaces and burning this metallic alkoxide. Further, the plasma display panel of the present invention uses the phosphor in which the phosphor particle surfaces are covered with the metallic oxide as mentioned above.

The phosphor for the plasma display panel of the present invention is excited by an ultraviolet ray having a short wavelength under vacuum and emits light. For example, this phosphor is constructed by an aluminate phosphor, a rare earth oxide phosphor and a silicate phosphor.

The metallic oxide used for the covering is preferably constructed by an alkaline earth metallic oxide or an aluminum oxide. For example, this metallic oxide is constructed by MgO, CaO, SrO, BaO and $Al_2O_3$ and may be constructed by using one or two kinds of these metallic oxides or more. An amount of the metallic oxide preferably ranges from 0.01 to 5.0 weight % with respect to a phosphor particle weight so as to improve light emitting efficiency and sufficiently restrain the deterioration of luminance and a change in chromaticity with the passage of time.

The phosphor particle surfaces may be covered with a close or dense film of the metallic oxide. This close film may be constructed by fine particles and may be preferably set to have a fine particle diameter from 1 to 100 nm.

The phosphor particles having surfaces covered with a close film formed by such a metallic oxide are formed by attaching a metallic alkoxide onto the phosphor particle surfaces as a base and burning this metallic alkoxide. There is a case in which partial hydrolysis and condensation are advanced at this stage in accordance with a kind and a condition of the metallic alkoxide.

The metallic alkoxide is constructed by an alkoxide having an alkyl group formed in a straight chain shape or a branching shape. For example, this metallic alkoxide is constructed by using a magnesium dimethoxide, a magnesium diethoxide, a magnesium dipropoxide, a magnesium dibutoxide, and other metallic alkoxides of corresponding calcium, strontium, barium, etc. The metallic alkoxide is preferably constructed by an alkaline earth metallic diethoxide since this alkaline earth metallic diethoxide is easily obtained and is easily treated.

Concretely, for example, the metallic alkoxide is first added to pure water or an alcohol aqueous solution and is dissolved so that a solution having a concentration (density) from 0.01 to 15.0 weight % is prepared. Next, phosphor particles are injected and stirred so that a metallic oxide caused by hydrolysis and condensation of the metallic alkoxide is attached to surfaces of the phosphor particles.

An amount of the used metallic alkoxide is different in accordance with an amount of the covered metallic oxide, but preferably ranges from 0.05 to 7.0 weight % with respect to a phosphor particle weight. Next, the processed phosphor particles are recovered by filtration and are dried. Thereafter, the phosphor particles are burned or baked in the atmosphere and are formed as a close film of the metallic oxide. In this case, the phosphor particles are normally burned at 300 to 500° C. and are typically burned at 400° C. for one to three hours.

In contrast to this, when the phosphor particle surfaces are covered with the metallic oxide as fine particles, the following method can be used. Namely, a predetermined amount of metallic oxide fine particles, preferably, metallic oxide fine particles having a particle diameter from 1 to 100 nm is injected into a suitable amount of pure water and is stirred and uniformly dispersed. Next, a predetermined amount of phosphor particles is injected into the above dispersion liquid and is stirred. Thereafter, filtration and drying processing are performed and burning processing is additionally performed for one to three hours at 300 to 500° C. in the atmosphere in accordance with necessity so that a desirable surface filmed phosphor is obtained. This burning processing is performed to return a metallic hydroxide partially formed in stirring fine particles of the metallic oxide in water to the metallic oxide.

For example, a plasma display panel can be manufactured as follows by using the surface covering phosphor particles of the present invention. Namely, for example, phosphor particles of the three primary colors are respectively mixed with a binder constructed by a cellulose including compound, a polymer compound such as polyvinyl alcohol and an organic solvent so that a phosphor paste is manufactured. A substrate surface formed in a stripe shape and partitioned by partition walls on the inner face of a rear face substrate and having an address electrode, and partition wall faces are coated with this paste by a method such as screen printing and are dried so that respective phosphor layers are formed. The respective phosphor layers are then overlapped with a surface glass substrate in which a transparent electrode and a bus electrode are arranged in a direction perpendicular to each of the phosphor layers and a dielectric layer and a protecting layer are arranged on an inner face of this surface glass substrate. The respective phosphor layers and the surface glass substrate are then adhered to each other. A discharging space is formed by reducing an internal pressure of the phosphor layers and the surface glass substrate so that a plasma display panel is manufactured.

DESCRIPTION OF THE PREFERRED EMBODIMENTS

Hereunder, embodiments of the present invention will be explained in detail with reference to the following Examples and Comparative Examples. In these examples, part(s) denotes part(s) by weight. The present invention is not limited to these Examples.

Phosphor particles of the Examples are evaluated as follows. Namely, an ultraviolet ray of 147 nm in wavelength is irradiated to phosphor particles as a sample in vacuum so as to excite these phosphor particles, and light emitting luminance $L_1$ is measured in this excitation. Next, these phosphor particles are dispersed to an organic solvent solution of a cellulose-including compound. The inner face of a rear face substrate is coated with these dispersed phosphor particles as a phosphor paste by screen printing. The phosphor particles are then dried so that a phosphor layer constructed by this phosphor is formed. A model plasma display panel (PDP) having the rear face substrate, an address electrode, partition walls, a protecting layer, a dielectric layer, a transparent electrode, a bus electrode and a surface glass substrate is manufactured by a normal method including this forming process.

Figure 2:
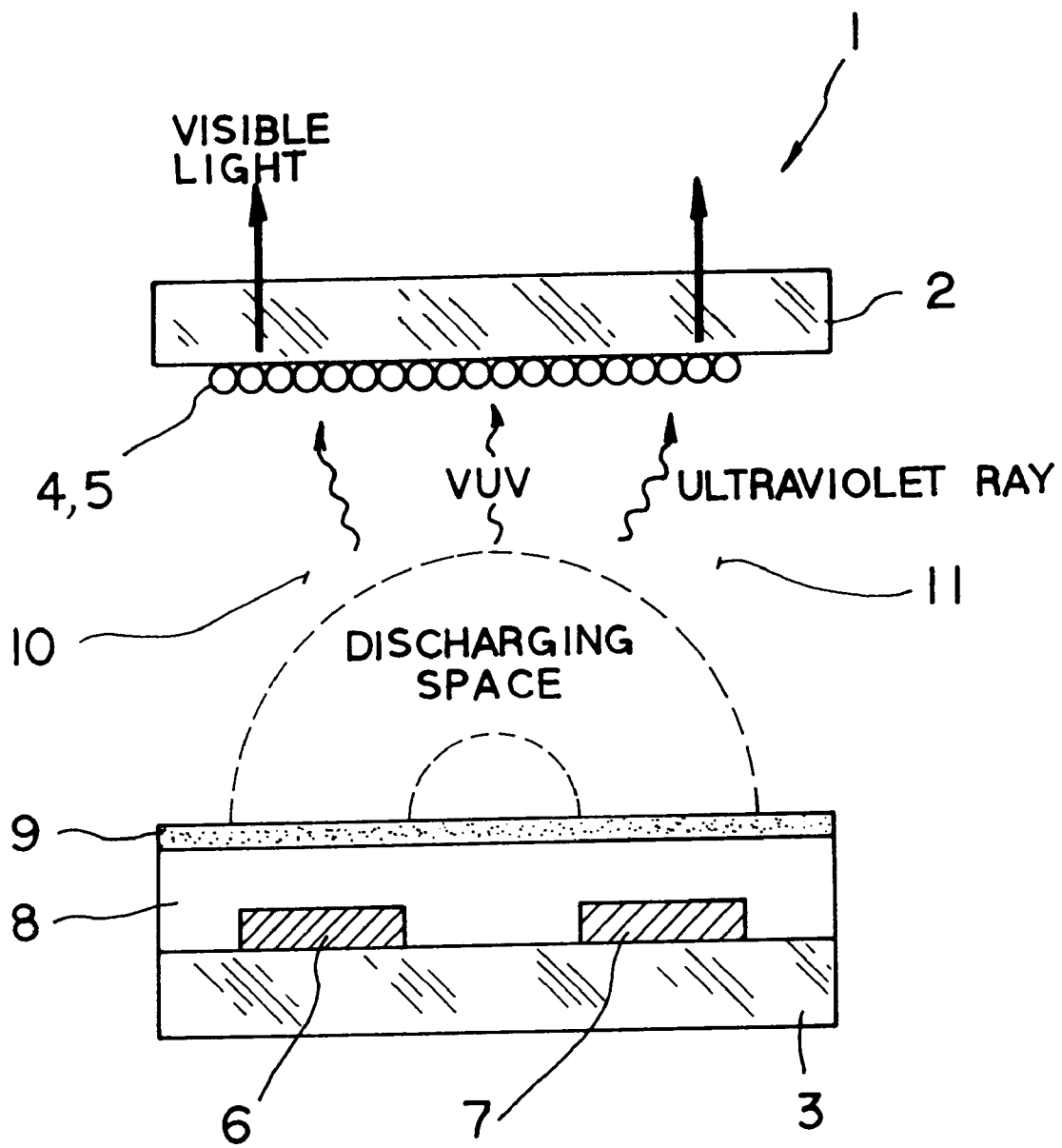
FIG. 2 is a cross-sectional view schematically showing a structure of a plasma display panel (PDP).

FIG. 2 is a cross-sectional view schematically showing the structure of the plasma display panel. In the structure of the plasma display panel 1, a front side substrate 2 and a rear side substrate 3 having a light transmitting property such as glass, etc. are oppositely arranged such that a predetermined discharging space 10 is formed. A light emitting layer 5 including particles of a phosphor 4 is formed on an inner surface of the above front side substrate 2. Many anodes 6 and many cathodes 7 each having a stripe shape are arranged on an inner surface of the above rear side substrate 3. Each group of the electrodes 6, 7 is covered with a dielectric layer 8. A surface of this dielectric layer 8 is further covered with a protecting layer 9. The discharging space 10 is set to have about 0.1 mm in height. A mixing gas 11 constructed by helium (He) gas or neon (Ne) gas and several vol. % of xenon (Xe) gas is sealed in the above discharging space 10 to generate an ultraviolet ray for exciting the phosphor 4 in discharging.

In the plasma display panel 1 of the above construction, the phosphor 4 is excited by a vacuum ultraviolet ray (VUV) having 147 nm in wavelength and discharged in resonance with xenon of the mixing gas 11 in the discharging space 10 of the electrodes 6, 7. As a result, visible light is radiated so that a predetermined image is displayed.

With respect to this plasma display panel, (initial) light emitting luminance $L_2$ just after the manufacture, and light emitting luminance $L_3$ after this model plasma display panel is operated for 1000 hours, are measured by using the ultraviolet ray of 147 nm in wavelength. Thus, a maintaining ratio $L_3/L_2$ of these light emitting luminances is calculated.

Similarly, a chromaticity point just after the manufacture, and a chromaticity point after the model plasma display panel is operated for 1000 hours, are measured with respect to the above model plasma display panel. The distance between chromaticity coordinates is then calculated and is determined to be a chromaticity changing amount $\Delta D$.

A similar measurement is taken as a Comparative Example with respect to phosphor particles each having an uncovered surface. In Tables 1 and 2, light emitting characteristics of the phosphor particles in each of the Examples are shown as relative values when $L_1$ of the phosphor particles and $L_2$ of the plasma display panel in each of corresponding Comparative Examples are respectively set to 100% and a chromaticity change of the plasma display panel in each of the Comparative Examples is set to 1.00.

Examples 1 to 4 and Comparative Example 1

12.0 parts of calcium diethoxide are added to 500 parts of pure water and are stirred for 30 minutes and are dissolved. Further, 100 parts of blue light emitting aluminate phosphor $BaMg_2Al_{14}O_{24}$:Eu are injected and stirred for 60 minutes and the surfaces of phosphor particles are covered with a calcium oxide. Next, the phosphor is recovered by filtration and is dried. The phosphor is then burned for two hours at 500° C. in the atmosphere. Thus, the phosphor particles having the covered surfaces in the Example 1 are obtained.

As results of an analysis and a surface observation using an electron microscope, the surfaces of the obtained phosphor particles are closely covered with a film of 1.0 weight % of calcium oxide.

Similar to the Example 1, phosphor particles of Example 2 are obtained except that 56.0 parts of magnesium diethoxide instead of the calcium diethoxide are used. Similarly, phosphor particles of Example 3 are obtained by using 0.07 part of barium diethoxide. Similarly, phosphor particles of Example 4 are obtained by using 22.5 parts of strontium diethoxide. As shown in the table 1, each of these phosphor particles has the close film of a metallic oxide corresponding to a used metallic alkoxide.

Phosphor characteristics are evaluated by the above-mentioned method with respect to the surface covering phosphor particles obtained in the Examples 1 to 4 and the phosphor particles each having no covered surface in the Comparative Example 1 as $BaMg_2Al_{14}O_{24}$:Eu. The evaluated results are shown in the table 1. Luminance of the phosphor, light emitting luminance as a plasma display panel and its maintaining ratio are excellent and chromaticity is stable with respect to the phosphor particles each having a close metallic oxide layer on its surface by the present invention in comparison with the phosphor particles of Comparative Example 1.

Figure 1:
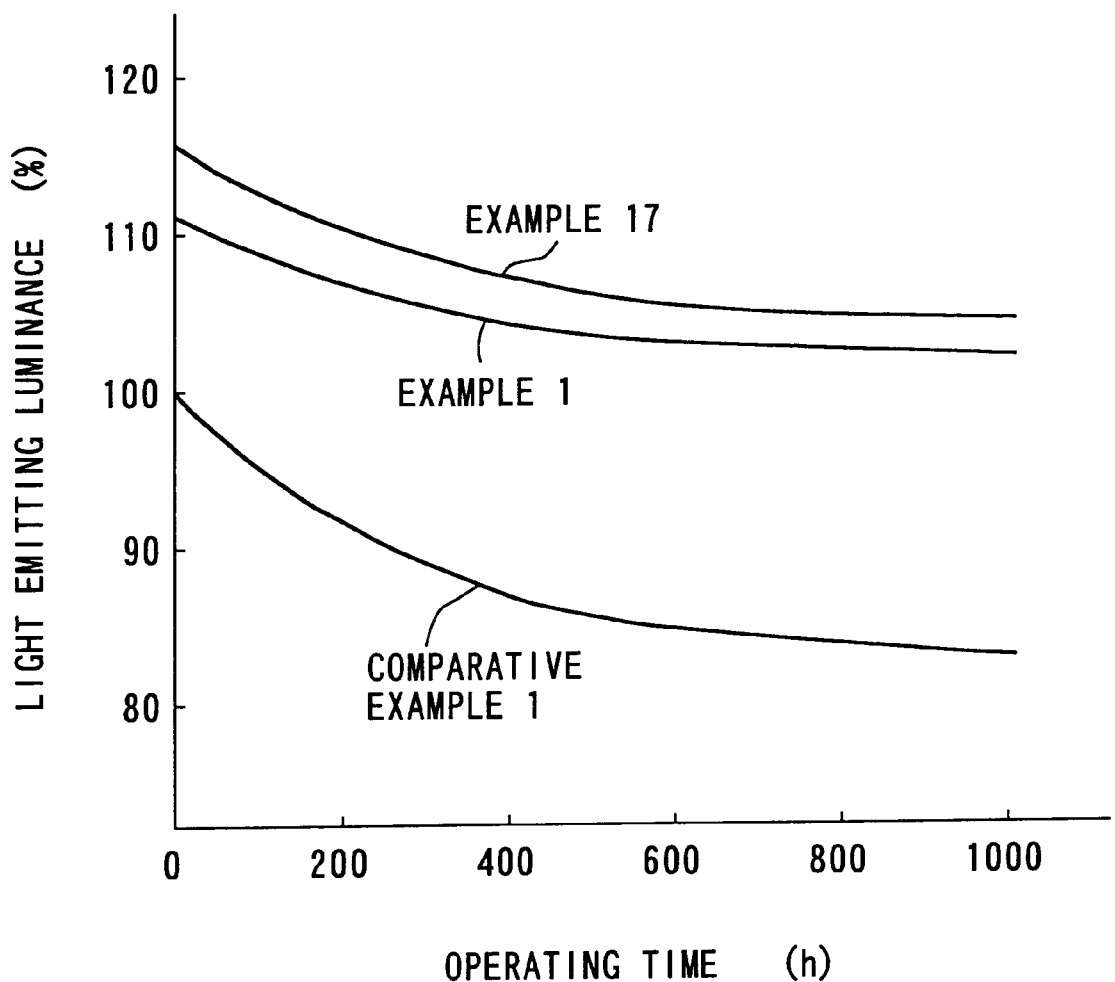
FIG. 1 is a graph showing a change in light emitting luminance of a plasma display panel using phosphor particles in each of Examples 1 and 17 and a Comparative Example 1 with the passage of time.

For example, changes in light emitting luminance with the passage of time are compared with each other with respect to the plasma display panel using the surface covering phosphor particles each having a film of 1.0 weight % of calcium oxide on its surface and obtained in the Example 1, and the plasma display panel using the phosphor particles of Comparative Example 1. The compared results are shown in FIG. 1. As can be seen from FIG. 1, the light emitting luminance of the plasma display panel of Example 1 initially shows 111% as a relative value with initial light emitting luminance $L_2$ of the plasma display panel of the Comparative Example 1 as 100%. The light emitting luminance of the plasma display panel of the Example 1 holds 102% after the plasma display panel is operated for 1000 hours. The maintaining ratio of the plasma display panel of the Example 1 is 0.92. Accordingly, both the light emitting luminance and the maintaining ratio of the plasma display panel of the Example 1 are excellent in comparison with the plasma display panel of the Comparative Example 1.

Examples 5 to 8 and Comparative Example 2

7.0 parts of magnesium diethoxide are added to 500 parts of pure water and are stirred for 30 minutes and are dissolved. Further, 100 parts of green light emitting silicate phosphor $Zn_2SiO_4$:Mn are injected and stirred for 60 minutes and the surfaces of phosphor particles are covered with a magnesium oxide. Next, the phosphor is recovered by filtration and is dried. The phosphor is then burned for two hours at 400° C. in the atmosphere. Thus, the phosphor particles having the covered surfaces in an Example 5 are obtained.

As results of an analysis and a surface observation using an electron microscope, the surfaces of the obtained phosphor particles are closely covered with a film of 0.5 weight % of magnesium oxide.

Similar to the Example 5, phosphor particles of an Example 6 are obtained except that 54.0 parts of calcium diethoxide instead of the magnesium diethoxide are used. Similarly, phosphor particles of an Example 7 are obtained by using 21.0 parts of barium diethoxide. Similarly, phosphor particles of an Example 8 are obtained by using 0.27 part of strontium diethoxide. As shown in the table 1, each of these phosphor particles has the close film of a metallic oxide corresponding to a used metallic alkoxide.

Phosphor characteristics are evaluated by the above-mentioned method with respect to the surface covering phosphor particles obtained in the Examples 5 to 8 and the phosphor particles each having no covered surface in the Comparative Example 2 as $ZnSiO_4$:Mn. The evaluated results are shown in the table 1. Luminance of the phosphor, light emitting luminance as a plasma display panel and its maintaining ratio are excellent and chromaticity is stable with respect to the phosphor particles each having a close metallic oxide layer on its surface by the present invention in comparison with the phosphor particles in the Comparative Example 2.

Examples 9 to 13 and Comparative Example 3

0.7 part of barium diethoxide is added to 500 parts of pure water and is stirred for 30 minutes and is dissolved. Further, 100 parts of red light emitting rare earth oxide phosphor $Y_2O_3$:Eu are injected and stirred for 60 minutes and the surfaces of phosphor particles are covered with a barium oxide. Next, the phosphor is recovered by filtration and is dried. The phosphor is then burned for two hours at 400° C. in the atmosphere. Thus, the phosphor particles having the covered surfaces of an Example 9 are obtained.

As results of an analysis and a surface observation using an electron microscope, the surfaces of the obtained phosphor particles are closely covered with a film of 0.1 weight % of barium oxide.

Similar to the Example 9, phosphor particles of an Example 10 are obtained except that 6.0 parts of calcium diethoxide instead of the barium diethoxide are used. Similarly, phosphor particles of an Example 11 are obtained by using 35.0 parts of magnesium diethoxide. Similarly, phosphor particles in of Example 12 are obtained by using 45.0 parts of strontium diethoxide. As shown in the table 1, each of these phosphor particles has the close film of a metallic oxide corresponding to a used metallic alkoxide.

Phosphor characteristics are evaluated by the above-mentioned method with respect to the surface covering phosphor particles obtained in the Examples 9 to 12 and the phosphor particles each having no covered surface in the Comparative Example 3 as $Y_2O_3$:Eu. The evaluated results are shown in the table 1. Luminance of the phosphor, light emitting luminance as a plasma display panel and its maintaining ratio are excellent and chromaticity is stable with respect to the phosphor particles each having a close metallic oxide layer on its surface by the present invention in comparison with the phosphor particles in the Comparative Example 3.

Example 13 to 16 and Comparative Example 4

36.0 parts of strontium diethoxide are added to 500 parts of pure water and are stirred for 30 minutes and are dissolved. Further, 100 parts of blue light emitting aluminate phosphor $BaAl_{12}O_{19}$:Mn are injected and stirred for 60 minutes and the surfaces of phosphor particles are covered with a strontium oxide. Next, the phosphor is recovered with filtration and is dried. The phosphor is then burned for two hours at 400° C. in the atmosphere. Thus, the phosphor particles having the covered surfaces in an Example 13 are obtained.

As results of an analysis and a surface observation using an electron microscope, the surfaces of the obtained phosphor particles are closely covered with a film of 4.0 weight % of strontium oxide.

Similar to the Example 13, phosphor particles of an Example 14 are obtained except that 24.0 parts of calcium diethoxide instead of the strontium diethoxide are used. Similarly, phosphor particles of an Example 15 are obtained by using 0.28 part of magnesium diethoxide. Similarly, phosphor particles of an Example 16 are obtained by using 24.5 parts of barium diethoxide. As shown in the table 1, each of these phosphor particles has the close film of a metallic oxide corresponding to a used metallic alkoxide.

Phosphor characteristics are evaluated by the above-mentioned method with respect to the surface covering phosphor particles obtained in the Examples 13 to 16 and the phosphor particles each having no covered surface in the Comparative Example 4 as $BaAl_{12}O_{19}$:Mn. The evaluated results are shown in the table 1. Luminance of the phosphor, light emitting luminance as a plasma display panel and its maintaining ratio are excellent and chromaticity is stable with respect to the phosphor particles each having a close metallic oxide layer on its surface by the present invention in comparison with the phosphor particles of the Comparative Example 4.

TABLE 1

| | | Metal Oxide | | Phosphor | PDP Light Emitting Luminance | | | Chromaticity Changing Amount |
| | | | | | | | | (After Operation for |
| Sample No. | Phosphor | Kind | Processing Amount (Weight %) | Luminance $L_1$ (%) | Initial $L_2$ (%) | After 1000 Hours $L_3$ (%) | Maintaining Ratio $L_3/L_2$ | 1000 Hours) $\Delta D$ |
|---|---|---|---|---|---|---|---|---|
| Example 1 | $BaMg_2Al_{14}O_{24}$:Eu | CaO | 1.0 | 108 | 111 | 102 | 0.92 | 0.80 |
| Example 2 | | MgO | 4.0 | 119 | 123 | 111 | 0.90 | 0.79 |
| Example 3 | | BaO | 0.05 | 109 | 114 | 101 | 0.89 | 0.82 |
| Example 4 | | SrO | 2.5 | 111 | 118 | 106 | 0.90 | 0.78 |
| Comparative Example 1 | | — | — | 100 | 100 | 83 | 0.83 | 1.00 |
| Example 5 | $Zn_2SiO_4$:Mn | MgO | 0.5 | 112 | 116 | 109 | 0.94 | 0.70 |
| Example 6 | | CaO | 4.5 | 117 | 121 | 111 | 0.92 | 0.75 |
| Example 7 | | BaO | 3.0 | 116 | 120 | 112 | 0.93 | 0.72 |
| Example 8 | | SrO | 0.03 | 108 | 112 | 108 | 0.96 | 0.80 |
| Comparative Example 2 | | — | — | 100 | 100 | 86 | 0.86 | 1.00 |
| Example 9 | $Y_2O_3$:Eu | BaO | 0.1 | 105 | 109 | 99 | 0.91 | 0.70 |
| Example 10 | | CaO | 0.05 | 107 | 113 | 102 | 0.90 | 0.68 |
| Example 11 | | MgO | 2.5 | 118 | 121 | 109 | 0.93 | 0.63 |
| Example 12 | | SrO | 5.0 | 103 | 106 | 99 | 0.96 | 0.67 |
| Comparative Example 3 | | — | — | 100 | 100 | 88 | 0.86 | 1.00 |
| Example 13 | $BaAl_{12}O_{19}$:Eu | SrO | 4.0 | 113 | 120 | 110 | 0.92 | 0.75 |
| Example 14 | | CaO | 2.0 | 115 | 121 | 113 | 0.93 | 0.74 |
| Example 15 | | MgO | 0.02 | 106 | 110 | 101 | 0.92 | 0.77 |
| Example 16 | | BaO | 3.5 | 118 | 123 | 111 | 0.90 | 0.75 |
| Comparative Example 4 | | — | — | 100 | 100 | 82 | 1.00 | 1.00 |

In addition to the above case, similar to the Example 1, the surfaces of phosphor particles of each of (Y, Gd) $BO_3$:Eu, $YBO_3$:Tb and $GdBO_3$:Eu as rare earth borate phosphors are covered with a calcium diethoxide so that phosphor particles each having the close film of a calcium oxide are obtained. Similar to the surface covering phosphor in each of the Examples 1 to 16, both the light emitting luminance and the maintaining ratio of the phosphor are excellent and its chromaticity is also stable.

Examples 17 to 20

1.0 part of alumina fine powder (particle diameter 50 nm) is injected into 500 parts of pure water and is stirred for 30 minutes so that the alumina fine powder is uniformly dispersed. Further, 100 parts of blue light emitting $BaMg_2Al_{14}O_{24}$:Eu are injected and stirred for about 60 minutes and the surfaces of phosphor particles are uniformly covered with alumina fine particles. Next, the phosphor is recovered by filtration and is dried. The phosphor is then burned for two hours at 500° C. in the atmosphere. Thus, the phosphor particles having the covered surfaces of an Example 17 are obtained.

As results of an analysis and a surface observation using an electron microscope, the surfaces of the obtained phosphor particles are uniformly covered with 1.0 weight % of alumina fine particles.

Similar to the Example 17, phosphor particles in an Example 18 are obtained except that 4.0 parts of magnesium oxide fine powder (particle diameter 20 nm) instead of alumina are used. Similarly, phosphor particles of an Example 19 are obtained by using 0.05 part of barium oxide fine powder (particle diameter 90 nm). Similarly, phosphor particles of an Example 20 are obtained by using 2.5 parts of strontium oxide fine powder (particle diameter 80 nm). The surface of each of these phosphor particles is uniformly covered with the fine particles of a used metallic oxide.

The phosphor particles each having the surface covered with metallic oxide fine particles and obtained in each of the Examples 17 to 20 are similarly evaluated and compared with evaluated values of the phosphor particles in the above Comparative Example 1. The compared results are shown in Table 2. Luminance of the phosphor, light emitting luminance as a plasma display panel and its maintaining ratio are excellent and chromaticity is stable with respect to the phosphor particles each having the surface covered with the metallic oxide fine particles by the present invention in comparison with the phosphor particles in the Comparative Example 1.

FIG. 1 also shows a change in light emitting luminance of the surface covering phosphor particles each having the surface covered with 1.0 weight % of alumina fine particles and obtained in the Example 17 with the passage of time. Similar to the Example 1, the light emitting luminance of the plasma display panel of the Example 17 initially shows 115% as a relative value with the light emitting luminance $L_2$ of the plasma display panel of the Comparative Example 1 as a reference. The light emitting luminance of the plasma display panel of the Example 17 holds 104% after the plasma display panel is operated for 1000 hours. The maintaining ratio of the plasma display panel of the Example 17 is 0.92.

Accordingly, both the light emitting luminance and the maintaining ratio of the plasma display panel of the Example 17 are excellent in comparison with the plasma display panel of the Comparative Example 1.

Examples 21 to 24

0.5 part of magnesium oxide (particle diameter 20 nm) is injected into 500 parts of pure water and is stirred for 30 minutes so that magnesium oxide fine powder is uniformly dispersed. Further, 100 parts of green light emitting phosphor of $Zn_2SiO_4$:Mn are injected and stirred for about 60 minutes and the surfaces of phosphor particles are uniformly covered with the magnesium oxide fine powder. Next, the phosphor is recovered by filtration and is dried. The phosphor is then burned for two hours at 400° C. in the atmosphere. Thus, the phosphor particles having the covered surfaces of an Example 21 are obtained.

As results of an analysis and a surface observation using an electron microscope, the surfaces of the obtained phosphor particles are uniformly covered with 0.5 weight % of magnesium oxide fine particles.

Similar to the Example 21, phosphor particles of an Example 22 are obtained except that 4.5 parts of alumina fine powder (particle diameter 50 nm) instead of the magnesium oxide are used. Similarly, phosphor particles of an Example 23 are obtained by using 3.0 parts of barium oxide fine powder (particle diameter 90 nm). Similarly, phosphor particles of an Example 24 are obtained by using 0.03 part of strontium oxide fine powder (particle diameter 80 nm). The surface of each of these phosphor particles is uniformly covered with the fine particles of a used metallic oxide.

The phosphor particles each having the surface covered with metallic oxide fine particles and obtained in each of the Examples 21 to 24 are similarly evaluated and compared with evaluated values of the phosphor particles of the above Comparative Example 2. The compared results are shown in the table 2. Luminance of the phosphor, light emitting luminance as a plasma display panel and its maintaining ratio are excellent and chromaticity is stable with respect to the phosphor particles each having the surface covered with the metallic oxide fine particles by the present invention in comparison with the phosphor particles of the Comparative Example 2.

Examples 25 to 28

0.1 part of barium oxide fine powder. (particle diameter 90 nm) is injected into 500 parts of pure water and is stirred for 30 minutes so that the barium oxide fine powder is uniformly dispersed. Further, 100 parts of red light emitting phosphor of $Y_2O_3$:Eu are injected and stirred for about 60 minutes and the surfaces of phosphor particles are uniformly covered with barium oxide fine particles. Next, the phosphor is recovered by filtration and is dried. The phosphor is then burned for two hours at 400° C. in the atmosphere. Thus, the phosphor particles having the covered surfaces of an Example 25 are obtained.

As results of an analysis and a surface observation using an electron microscope, the surfaces of the obtained phosphor particles are uniformly covered with 0.1 weight % of barium oxide fine particles.

Similar to the Example 25, phosphor particles of an Example 26 are obtained except that 0.05 part of alumina fine powder (particle diameter 50 nm) instead of the barium oxide is used. Similarly, phosphor particles of an Example 27 are obtained by using 2.5 parts of magnesium oxide fine powder (particle diameter 20 nm). Similarly, phosphor particles of an Example 28 are obtained by using 5.0 parts of strontium oxide fine powder (particle diameter 80 nm). The surface of each of these phosphor particles is uniformly covered with the fine particles of a used metallic oxide.

The phosphor particles each having the surface covered with metallic oxide fine particles and obtained in each of the Examples 25 to 28 are similarly evaluated and compared with evaluated values of the phosphor particles in the above Comparative Example 3. The compared results are shown in the table 2. Luminance of the phosphor, light emitting luminance as a plasma display panel and its maintaining ratio are excellent and chromaticity is stable with respect to the phosphor particles each having the surface covered with the metallic oxide fine particles by the present invention in comparison with the phosphor particles in the Comparative Example 3.

Examples 29 to 32

4.0 parts of strontium oxide fine powder (particle diameter 80 nm) are injected into 500 parts of pure water and are stirred for 30 minutes so that the strontium oxide fine powder is uniformly dispersed. Further, 100 parts of blue light emitting $BaAl_{12}O_{18}$:Eu are injected and stirred for about 60 minutes and the surfaces of phosphor particles are uniformly covered with strontium oxide fine particles. Next, the phosphor is recovered by filtration and is dried. The phosphor is then burned for two hours at 500° C. in the atmosphere. Thus, the phosphor particles having the covered surfaces of an Example 29 are obtained.

As results of an analysis and a surface observation using an electron microscope, the surfaces of the obtained phosphor particles are uniformly covered with 4.0 weight % of strontium oxide fine particles.

Similar to the Example 29, phosphor particles of an Example 30 are obtained except that 2.0 parts of alumina fine powder (particle diameter 50 nm) instead of the strontium oxide are used. Similarly, phosphor particles of an Example 31 are obtained by using 0.02 part of magnesium oxide fine powder (particle diameter 20 nm). Similarly, phosphor particles of an Example 32 are obtained by using 3.5 parts of barium oxide fine powder (particle diameter 90 nm). The surface of each of these phosphor particles is uniformly covered with the fine particles of a used metallic oxide.

The phosphor particles each having the surface covered with metallic oxide fine particles and obtained in each of the Examples 29 to 32 are similarly evaluated and compared with evaluated values of the phosphor particles of the above Comparative Example 4. The compared results are shown in the table 2. Luminance of the phosphor, light emitting luminance as a plasma display panel and its maintaining ratio are excellent and chromaticity is stable with respect to the phosphor particles each having the surface covered with the metallic oxide fine particles by the present invention in comparison with the phosphor particles of the Comparative Example 4. Data in the Comparative Examples 1 to 4 of the table 1 are again shown for comparison in the table 2.

TABLE 2

| Sample No. | Phosphor | Metal Oxide Kind | Metal Oxide Processing Amount (Weight %) | Phosphor Luminance $L_1$ (%) | PDP Light Emitting Luminance Initial $L_2$ (%) | PDP Light Emitting Luminance After 1000 Hours $L_3$ (%) | PDP Light Emitting Luminance Maintaining Ratio $L_3/L_2$ | Chromaticity Changing Amount (After Operation for 1000 Hours) $\Delta D$ |
|---|---|---|---|---|---|---|---|---|
| Example 17 | $BaMg_2Al_{14}O_{24}$:Eu | $Al_2O_3$ | 1.0 | 110 | 115 | 104 | 0.90 | 0.75 |
| Example 18 | | MgO | 4.0 | 121 | 125 | 110 | 0.88 | 0.82 |
| Example 19 | | BaO | 0.05 | 108 | 110 | 102 | 0.93 | 0.80 |
| Example 20 | | SrO | 2.5 | 115 | 118 | 109 | 0.92 | 0.78 |
| Comparative Example 1 | | — | — | 100 | 100 | 83 | 0.83 | 1.00 |
| Example 21 | $Zn_2SiO_4$:Mn | MgO | 0.5 | 115 | 120 | 110 | 0.92 | 0.70 |
| Example 22 | | $Al_2O_3$ | 4.5 | 121 | 126 | 113 | 0.90 | 0.74 |
| Example 23 | | BaO | 3.0 | 112 | 118 | 112 | 0.95 | 0.71 |
| Example 24 | | SrO | 0.03 | 110 | 118 | 116 | 0.97 | 0.75 |
| Comparative Example 2 | | — | — | 100 | 100 | 86 | 0.86 | 1.00 |
| Example 25 | $Y_2O_3$:Eu | BaO | 0.1 | 108 | 113 | 105 | 0.93 | 0.66 |
| Example 26 | | $Al_2O_3$ | 0.05 | 115 | 118 | 110 | 0.93 | 0.68 |
| Example 27 | | MgO | 2.5 | 120 | 125 | 114 | 0.91 | 0.62 |
| Example 28 | | SrO | 5.0 | 104 | 110 | 104 | 0.95 | 0.65 |
| Comparative Example 3 | | — | — | 100 | 100 | 88 | 0.88 | 1.00 |
| Example 29 | $BaAl_{12}O_{19}$:Eu | SrO | 4.0 | 116 | 120 | 108 | 0.90 | 0.71 |
| Example 30 | | $Al_2O_3$ | 2.0 | 118 | 123 | 112 | 0.91 | 0.76 |
| Example 31 | | MgO | 0.02 | 109 | 115 | 107 | 0.93 | 0.80 |
| Example 32 | | BaO | 3.5 | 114 | 118 | 105 | 0.89 | 0.73 |
| Comparative Example 4 | | — | — | 100 | 100 | 82 | 0.82 | 1.00 |

In addition to the above case, similar to the Example 1, the surfaces of phosphor particles of each of (Y, Gd)$BO_3$:Eu, $YBO_3$:Tb and $GdBO_3$:Eu as rare earth borate phosphors are covered with alumina so that phosphor particles each having a film of alumina fine particles are obtained. Similar to the surface covering phosphor in each of the Examples 17 to 32, both the light emitting luminance and the maintaining ratio of the phosphor are excellent and its chromaticity is also stable.

In accordance with the present invention, it is possible to provide a phosphor for a plasma display panel having high light emitting efficiency in excitation caused by an ultraviolet ray of 147 nm in wavelength, and having high light emitting luminance and a high maintaining ratio, and having a small change in chromaticity with the passage of time when the phosphor is used as a phosphor layer of the plasma display panel. The present invention also provides a manufacturing method of this phosphor for the plasma display panel and the plasma display panel using this phosphor. The present invention is extremely useful to improve and stabilize phosphor characteristics of the plasma display panel.

What is claimed is:

1. A phosphor for a plasma display panel wherein the surfaces of phosphor particles are covered with a metallic oxide generated by hydrolysis from a metallic alkoxide, and wherein said phosphor has been excited by a vacuum ultraviolet ray of 147 nm in wavelength.

2. The phosphor for the plasma display panel as claimed in claim 1, wherein the metallic oxide is at least one kind of metallic oxide selected from a group consisting of MgO, CaO, SrO, BaO and $Al_2O_3$.

3. The phosphor for the plasma display panel as claimed in claim 1, wherein a covering amount of the metallic oxide ranges from 0.01 to 5.0 weight % of the phosphor particles.

4. The phosphor for the plasma display panel as claimed in claim 1, wherein the phosphor particles are covered with a close film of the metallic oxide.

5. The phosphor for the plasma display panel as claimed in claim 1, wherein the phosphor particles are covered with fine particles of the metallic oxide.

6. A manufacturing method of a phosphor for a plasma display panel, comprising the steps of:

attaching a metallic alkoxide solution to the surfaces of phosphor particles;

burning this metallic alkoxide solution to generate hydrolysis so that said surfaces of phosphor particles are covered with a substantially transparent metallic oxide film; and exciting said phosphor particles by a vacuum ultraviolet ray of 147 nm in wavelength.

7. The manufacturing method of the phosphor for the plasma display panel as claimed in claim 6, wherein the metallic alkoxide is an alkaline earth metal diethoxide.

8. A plasma display panel comprising the phosphor of any one of claims 1 to 5.

* * * * *